US007280098B2

(12) United States Patent
Komelson

(10) Patent No.: US 7,280,098 B2

(45) Date of Patent: Oct. 9, 2007

(54) JOYSTICK HOUSING AND MOUNTING BRACKET

(76) Inventor: Brent A. Komelson, #4 - 1413 McGill Road, Kamloops, British Columbia (CA) V2C 6K7

( * ) Notice: Subject to any disclaimer, the term of this patent is extended or adjusted under 35 U.S.C. 154(b) by 738 days.

(21) Appl. No.: 10/836,214

(22) Filed: May 3, 2004

(65) Prior Publication Data

US 2004/0221674 A1 Nov. 11, 2004

Related U.S. Application Data

(60) Provisional application No. 60/468,662, filed on May 8, 2003.

(51) Int. Cl.

*G06F 3/033* (2006.01)
*G05G 9/047* (2006.01)
*A63F 13/08* (2006.01)

(52) U.S. Cl. ........................ 345/161; 345/156; 463/38; 74/471 XY

(58) Field of Classification Search ................ 345/156, 345/161; 463/38; 74/471 XY, 471 X
See application file for complete search history.

(56) References Cited

U.S. PATENT DOCUMENTS

| | | | | |
|---|---|---|---|---|
| 5,421,694 | A * | 6/1995 | Baker et al. | 414/694 |
| 5,468,924 | A * | 11/1995 | Naitou et al. | 200/6 A |
| 5,675,359 | A | 10/1997 | Anderson | |
| 6,215,472 | B1 * | 4/2001 | Chen | 345/161 |
| 6,462,731 | B1 * | 10/2002 | Stoffers et al. | 345/161 |
| 7,109,971 | B2 * | 9/2006 | Furukawa | 345/161 |

* cited by examiner

*Primary Examiner*—Richard Hjerpe
*Assistant Examiner*—My-Chau T. Tran
(74) *Attorney, Agent, or Firm*—Antony C. Edwards

(57) ABSTRACT

A joystick includes a handle, a base shaft having opposite upper and lower ends, and a curvilinear housing. The handle is mounted on the upper end of the base shaft. The lower end of the base shaft is mounted into the curvilinear housing. The curvilinear housing has an outer curvilinear surface formed so as to include at least a clamp support portion of a zone of a spheroid between two generally horizontal and parallel planes. The zone includes a portion of the spheroid having the maximum circumference of the spheroid so that the curvilinear housing may be braced by clamped support of the portion. A releasable clamp having at least two cooperating clamp members is releasably mountable by releasable fasteners onto the clamp support portion along a clamp-member interface so as to support and clamp therebetween the portion of the spheroid having the maximum circumference of the spheroid.

20 Claims, 10 Drawing Sheets

JOYSTICK HOUSING AND MOUNTING BRACKET

CROSS REFERENCE TO RELATED APPLICATION

This application claims priority from U.S. Provisional Patent Application No. Ser. 60/468,662 filed May 8, 2003 entitled Joystick Housing and Mounting Bracket.

FIELD OF THE INVENTION

This invention relates to the field of joystick and joystick housing mounting brackets, and in particular to an improved mounting bracket allowing adjustment of the orientation of the joystick for the comfort of the user.

BACKGROUND OF THE INVENTION

In the prior art, applicant is aware of U.S. Pat. No. 5,675,359 which issued Oct. 7, 1997 to Anderson for a Joystick Controller. As set out therein, it is known in the prior art that Joystick controllers are used to translate operator manipulations to electrical control signals. At least a direction and often velocity of motion are controlled. Typical applications are found in industrial equipment and construction equipment, such as forklift trucks and excavating equipment, where a joystick can provide one-hand operation of direction and speed in order to free the operator's other hand for controlling other aspects of the machine. Other typical applications for joysticks are in booms, trenching equipment, jetways, and the like. It is important that joysticks used in such industrial, construction and transportation devices be dependable and accurate in their response to operator inputs. In this regard, it is desirable that a joystick include rugged mechanical structure for receiving the operator manipulation, and means for translating the operator input into control signals which are accurate and cannot be abused or damaged by such operator inputs.

What is set out as being provided in the device of Anderson is a joystick controller for omnidirectional pivoting manual displacement by an operator to produce electrical control signals, comprising a mounting plate and a joystick shaft extending through the mounting plate and gimbal mounted to the mounting plate intermediate its length. The joystick shaft has an operator's knob on one end thereof, and a gauge plate is mounted to the other end of the joystick shaft.

What is neither taught nor suggested, and which it is an object to provide, is an improved joystick controller mounting bracket allowing for simplified angular adjustment of the joystick orientation for the comfort of the user.

SUMMARY OF THE INVENTION

The joystick housing and mounting bracket of the present invention may include a rigid upstanding member pivotally mounted into an upper end of a housing which is shaped around its exterior as a three-dimensional curvilinear body, the housing mounted or mountable in a snug ball-and-socket fit between a pair of annular rings sandwiching therebetween in a pinch fitment the girth-band around the housing having the largest circumference. Releasable fastening means for clamping the pair of annular rings together are adapted for release by a user so as to release the pinch-fit of the rings clamping the girth-band therebetween. Once so released, the housing may be rotated in the manner of a ball within the socket formed between the pair of annular rings so as to incline or angle the upstanding member, when in its at-rest position generally orthogonal to the top of the housing, so that, when a handle for grasping by the user is mounted on the member, the handle is correspondingly inclined to a comfortable position for use by the user. Once so inclined, the housing may be clamped into the inclined orientation by the user re-fastening or re-clamping together the pair of annular rings by the fastening means.

It is not intended that the illustrated truncated sphere or ball shape of the housing be limiting. Other three-dimensional curvilinear shaped bodies will work, for example those which are other zones of a sphere or ellipsoids or other spheroids, whether truncated or not, so long as they may be inclined in a base or releasably fixed or otherwise engaged in the inclined position in the base by a releasable engaging means. Collectively they are referred to herein as spheroids. The pair of annular rings are but one example of such an engaging means, wherein the base, such as the lower annular ring, is mountable to a rigid supporting surface such as a consol or arm-rest.

In summary, the joystick according to the present invention includes a handle, a base shaft having opposite upper and lower ends, and a curvilinear housing. The handle is mounted on the upper end of the base shaft. The lower end of the base shaft is mounted into the curvilinear housing.

The curvilinear housing has an outer curvilinear surface formed so as to include at least a clamp support portion of a zone of a spheroid between two generally horizontal and parallel planes. The zone includes a portion of the spheroid having the maximum circumference of the spheroid so that the curvilinear housing may be braced by clamped support of the portion. A releasable clamp having at least two cooperating clamp members is releasably mountable by releasable fasteners onto the clamp support portion along a clamp-member interface so as to support and clamp therebetween the portion of the spheroid having the maximum circumference of the spheroid.

In one embodiment, the clamp-member interface may be substantially vertical. In another embodiment the clamp-member interface may be substantially horizontal.

In a preferred embodiment not intended to be limiting, the spheroid or curvilinear housing is a sphere and the clamp support portion of the zone is a continuous curvilinear band around the spheroid or sphere or curvilinear housing.

Where the interface is horizontal, the clamp members may be plates each having apertures sized to snugly mate onto the spheroid. The releasable fasteners may be threaded fasteners releasably mating the plates together so as to sandwich therebetween the zone containing the maximum circumference. The fasteners may be vertical.

Where the interface is vertical, clamp members may be a pair of C-shaped channelled brackets mounted in opposed facing relation so as to form a snug ring around the band. Because the band contains the maximum circumference, the spheroid is thereby clamped and supported within the ring. The channel brackets may have contact channels contacting the spheroid around the snug ring. The contact channels may be concave in cross-section. The releasable fasteners may be threaded fasteners releasably mating the channelled brackets together so as to sandwich the band therebetween. The threaded fasteners may be horizontal.

DETAILED DESCRIPTION OF EMBODIMENTS OF THE INVENTION

Figure 1:
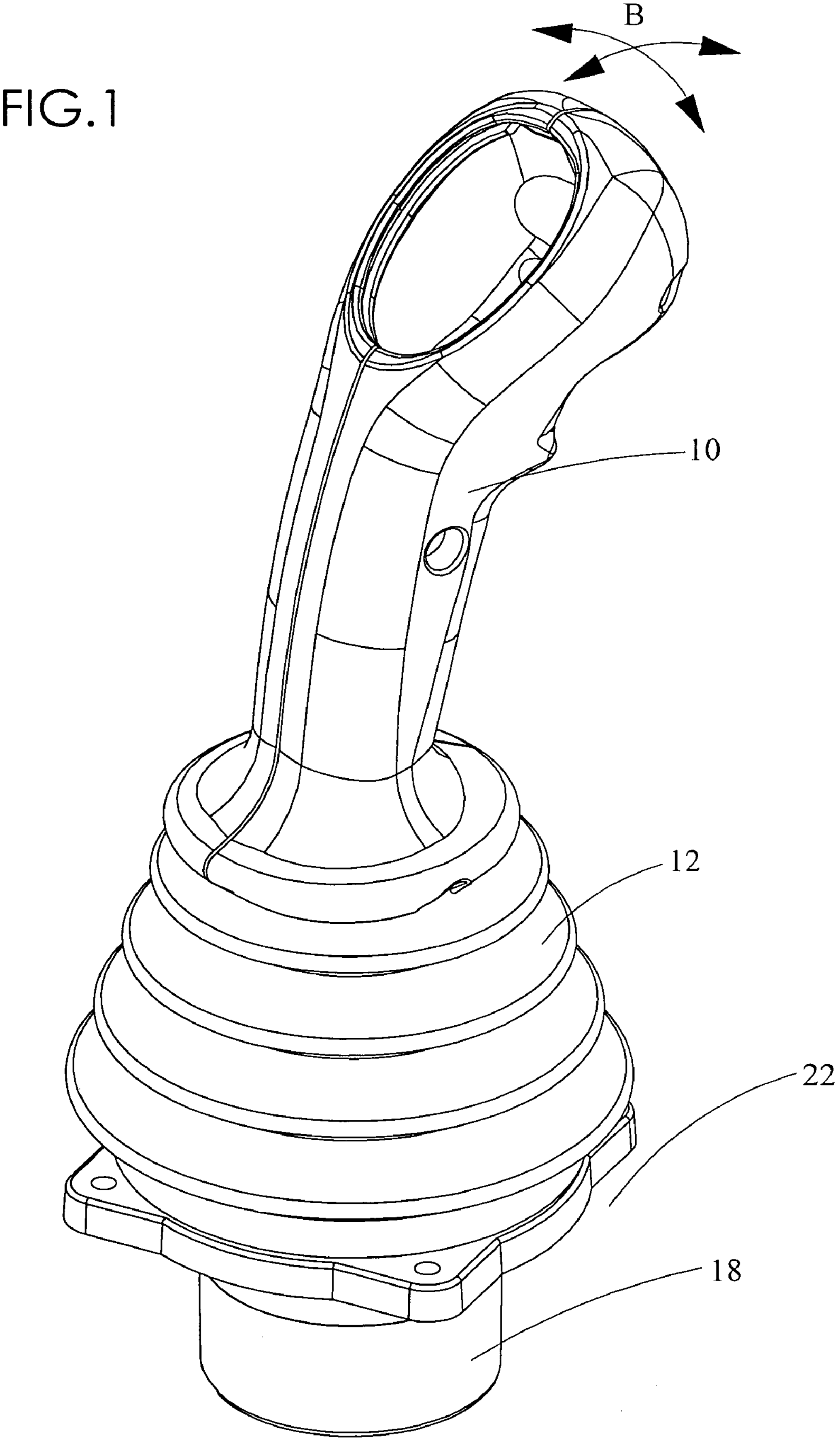
FIG. 1 is an environmental view of the joystick according to the present invention with a control handle and flexible boot installed thereon.

With reference to the drawings wherein similar characters are referenced and denote corresponding parts in each view, in FIG. 1 the joystick according to the present invention has a control handle 10 and a flexible boot or casing 12 mounted thereon.

Figure 2:
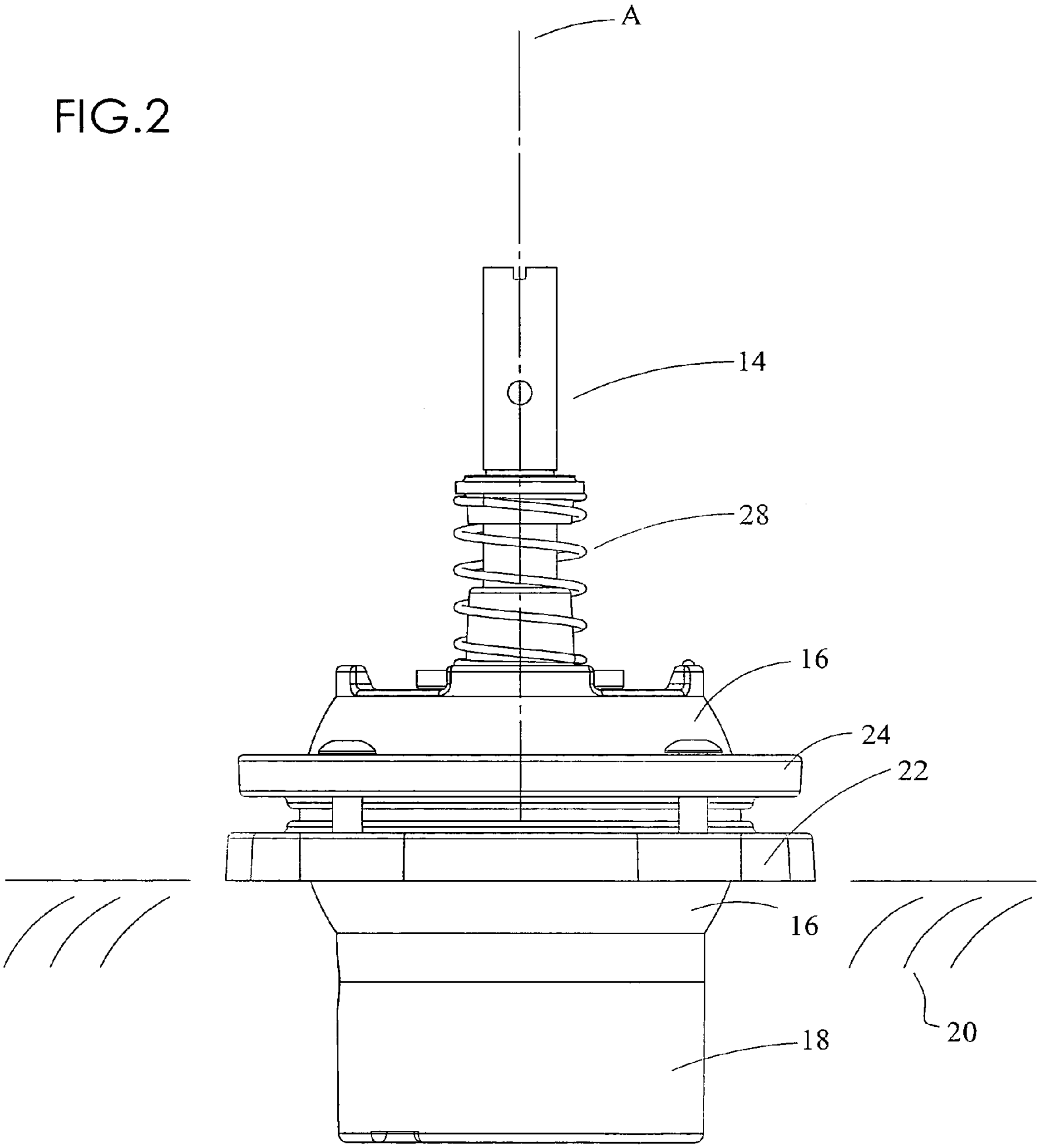
FIG. 2 shows the joystick of FIG. 1 in a vertical position in relation to the mounting brackets.

As illustrated in FIG. 2, casing 12 and control handle 10 may be removed to expose the joystick supporting structure according to the present invention. A shaft 14 is pivotally mounted, for example with two degrees of freedom, to, so to protrude from, a curvilinear housing 16 and which may be deflected in direction B inclined out of an initial rest position orthogonal to the top of the housing. Shaft 14 is resiliently biased by a spring 28 so as to urge from inclined positions to its rest position. Sensors (not shown) are provided in housing 16 to sense the different angular positions of shaft 14 relative to housing 16 and to generate an output signal which may be used to control and operate a machine, vehicle, vehicle functions, or the like.

Base 18 is mounted to the lower end of curvilinear housing 16. Curvilinear housing is releasably clamped between a pair of mounting brackets 22 and 24 having a generally horizontal planar clamping or clamp-member interface zone therebetween. In this embodiment the interface zone is a continuous band around the sphere of the curvilinear housing, although this is not intended to be limiting. Lower mounting bracket 22 snugly fits around housing 16 and is snugly attached by a plurality of bolts through apertures such as aperture 20*a* to a surface 20 such as an armrest, dashboard or the like, so that part of housing 16 is above surface 20 and the other part is underneath surface 20. Upper angular mounting bracket 24 snugly fits around housing 16 and above lower angular mounting bracket 22. A plurality of screws 26 are journalled through apertures in upper mounting bracket 24 and into lower mounting bracket 22 so as to fix housing 16 in place. In particular, housing 16 may be shaped as a ball or sphere or other three dimensional body of revolution (herein also collectively referred to as a spheroid) truncated top and bottom by top plate 10*a* and base 18 respectively, wherein the maximum girth, or alternatively circumference, of the housing is supported by, and sandwiched in a socket formed between, annular brackets 22 and 24 collectively to form a spheroid-and-socket mounting between the housing and brackets. Thus the housing 16 may be rotated relative to the sandwiching of the two brackets when the brackets are separated to release the frictional mounting of the brackets tightened onto the maximum girth of the housing.

Figure 3:
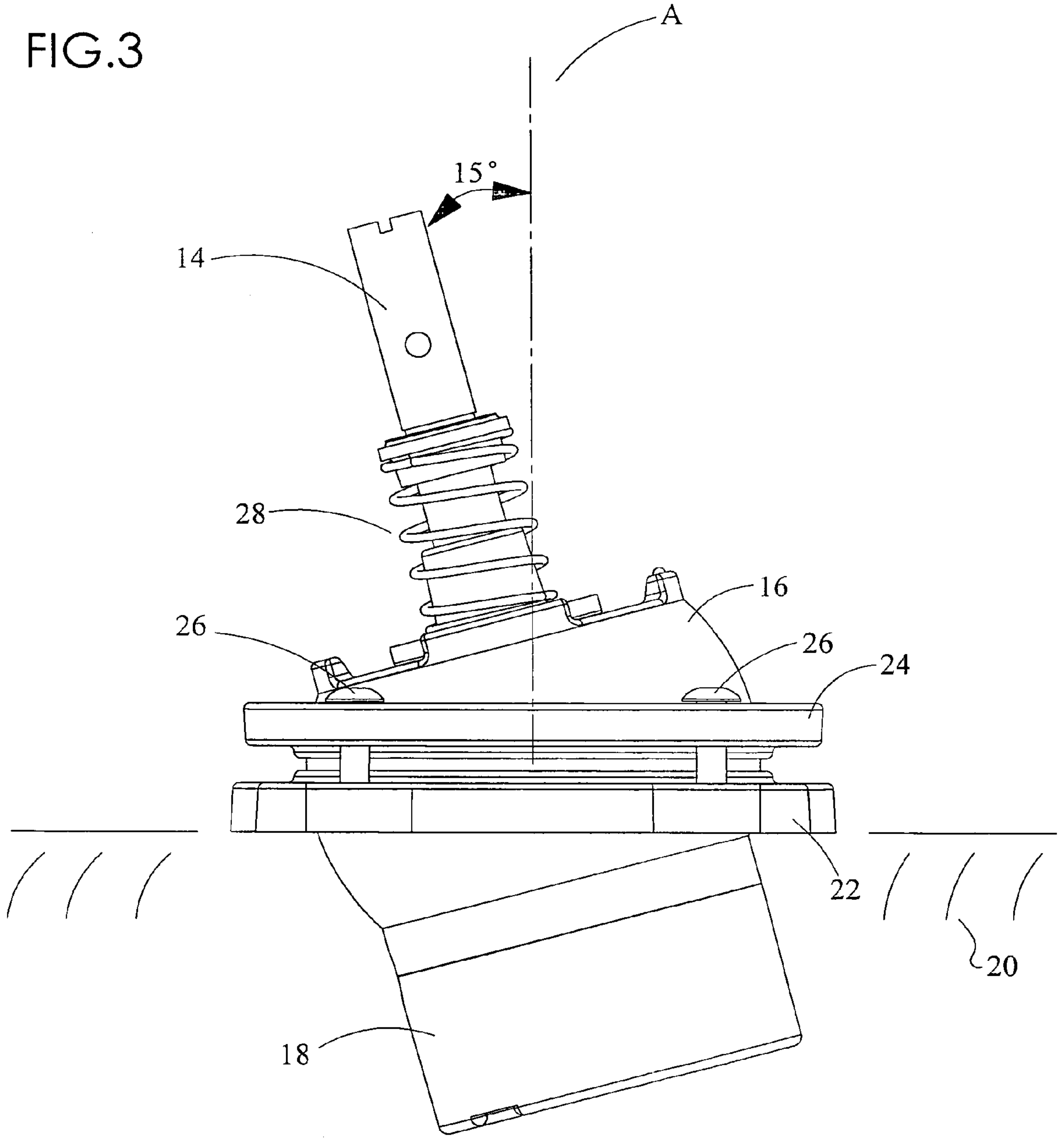
FIG. 3 shows the joystick of FIG. 2 in an inclined position in relation to the mounting brackets.
Figure 4:
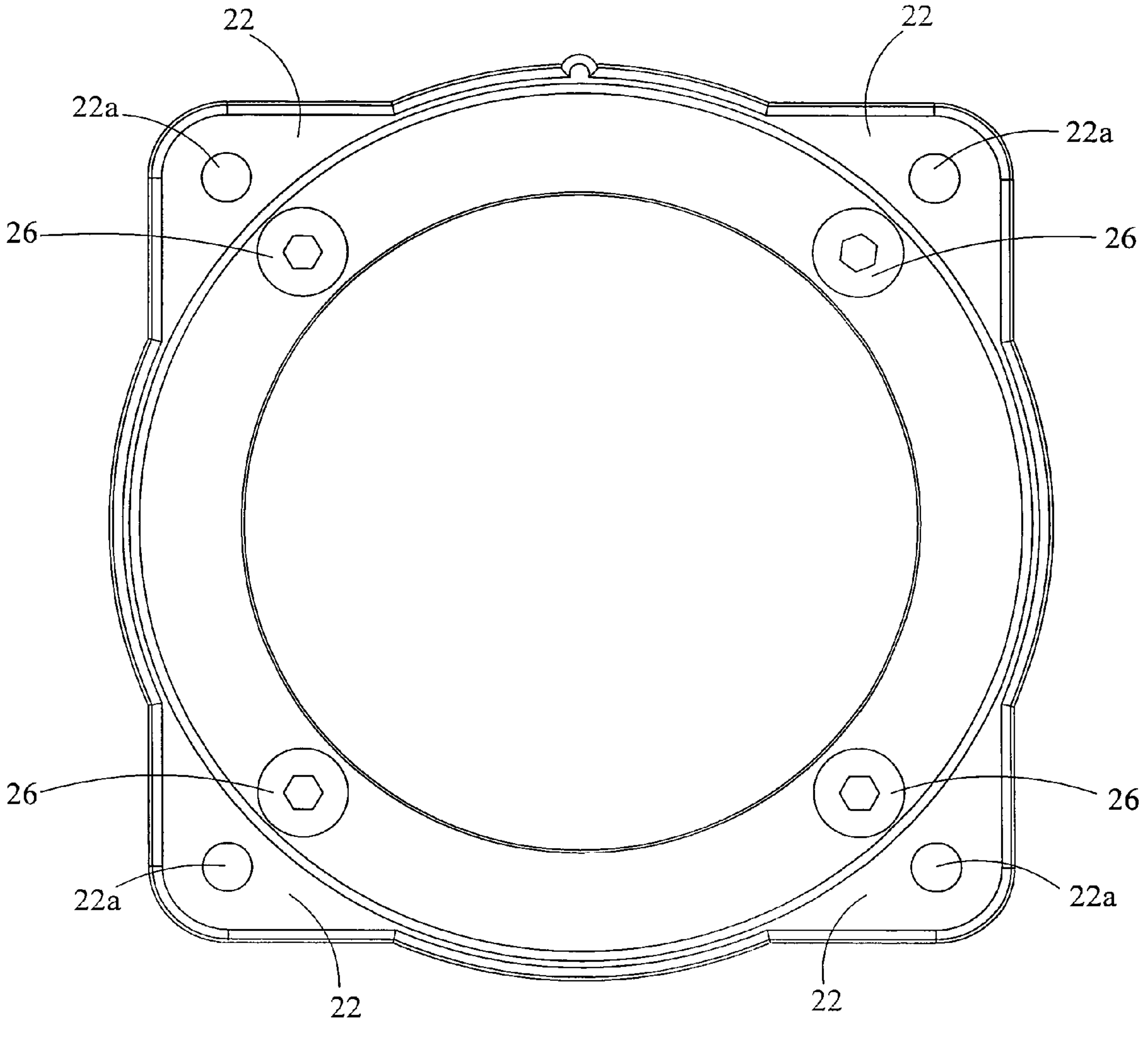
FIG. 4 is a top view of the mounting brackets of FIG. 2.
Figure 5:
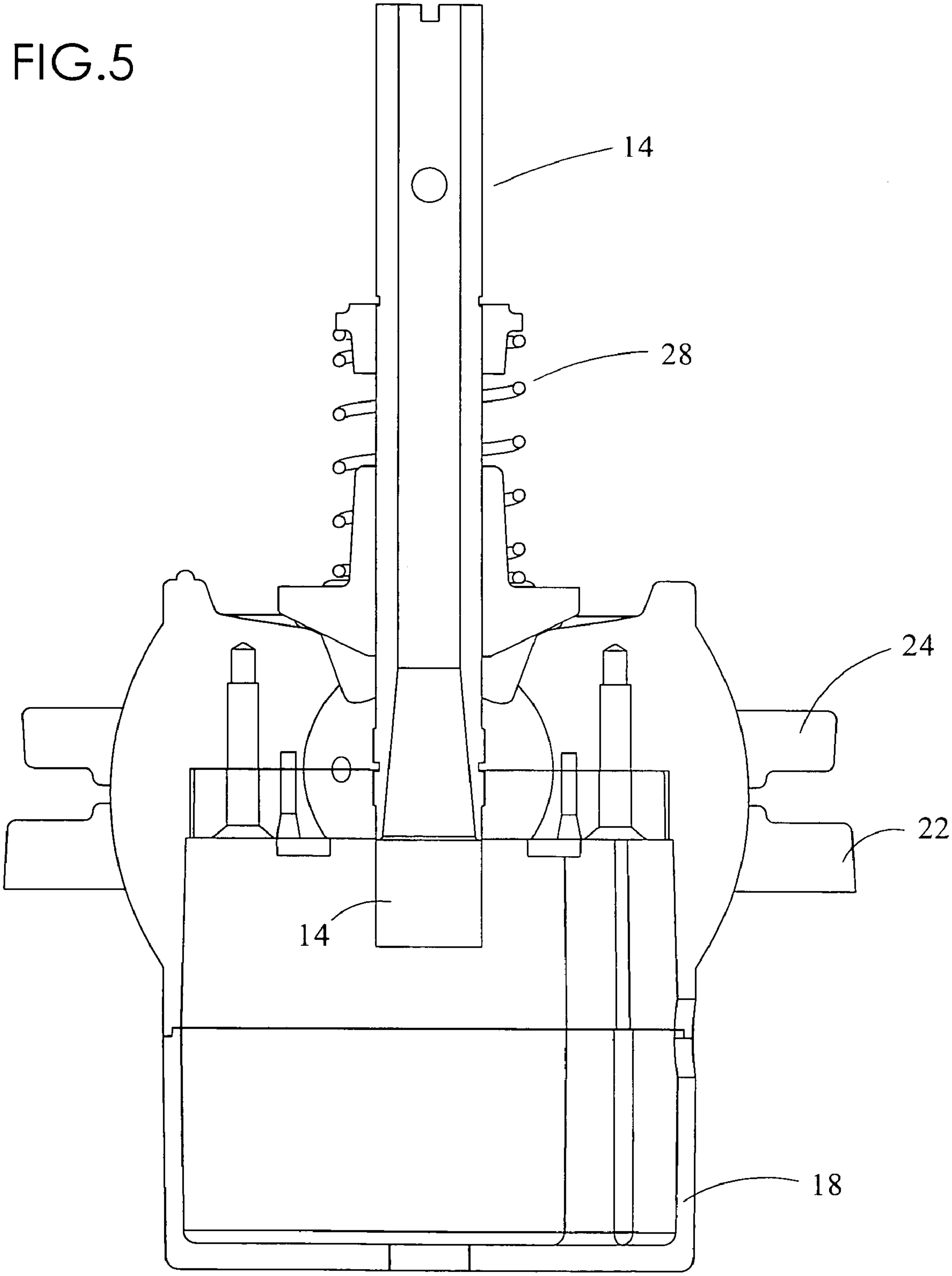
FIG. 5 is a cross-sectional view through the shaft and housing of FIG. 2.
Figure 6:
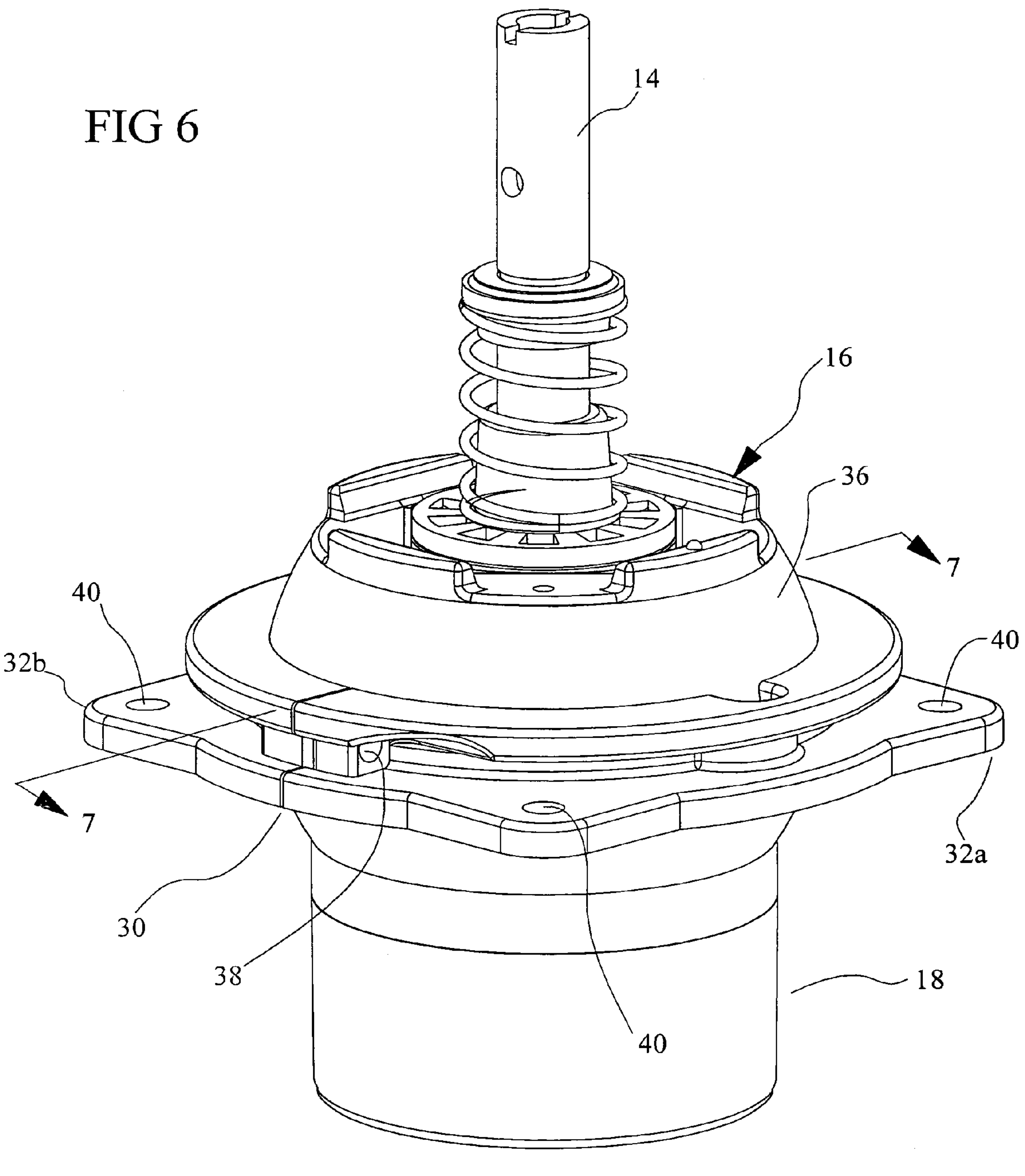
FIG. 6 is, in perspective view, a further embodiment of the joystick housing and mounting bracket according to the present invention.
Figure 7:
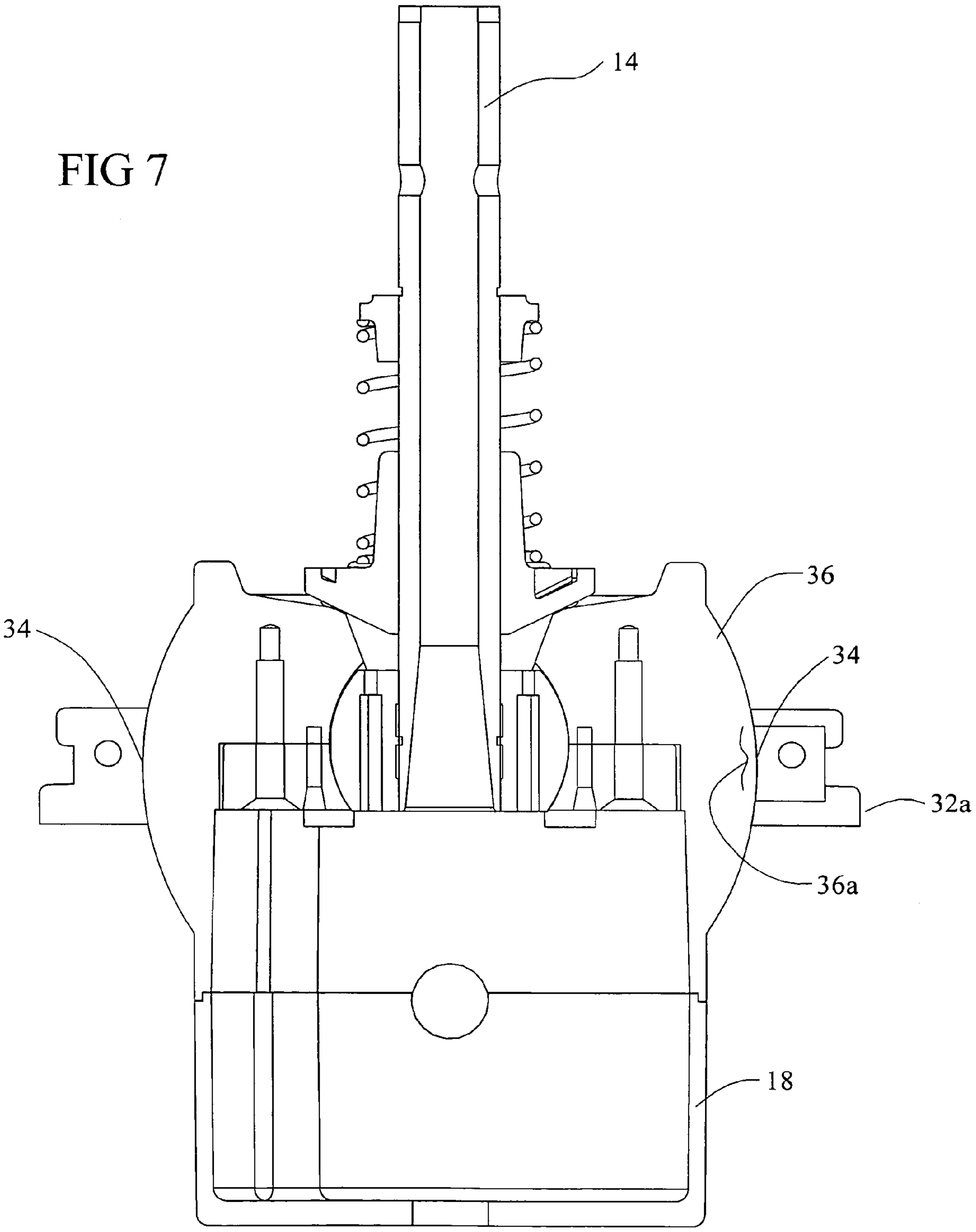
FIG. 7 is a sectional view along line 7-7 in FIG. 6.
Figure 8A:
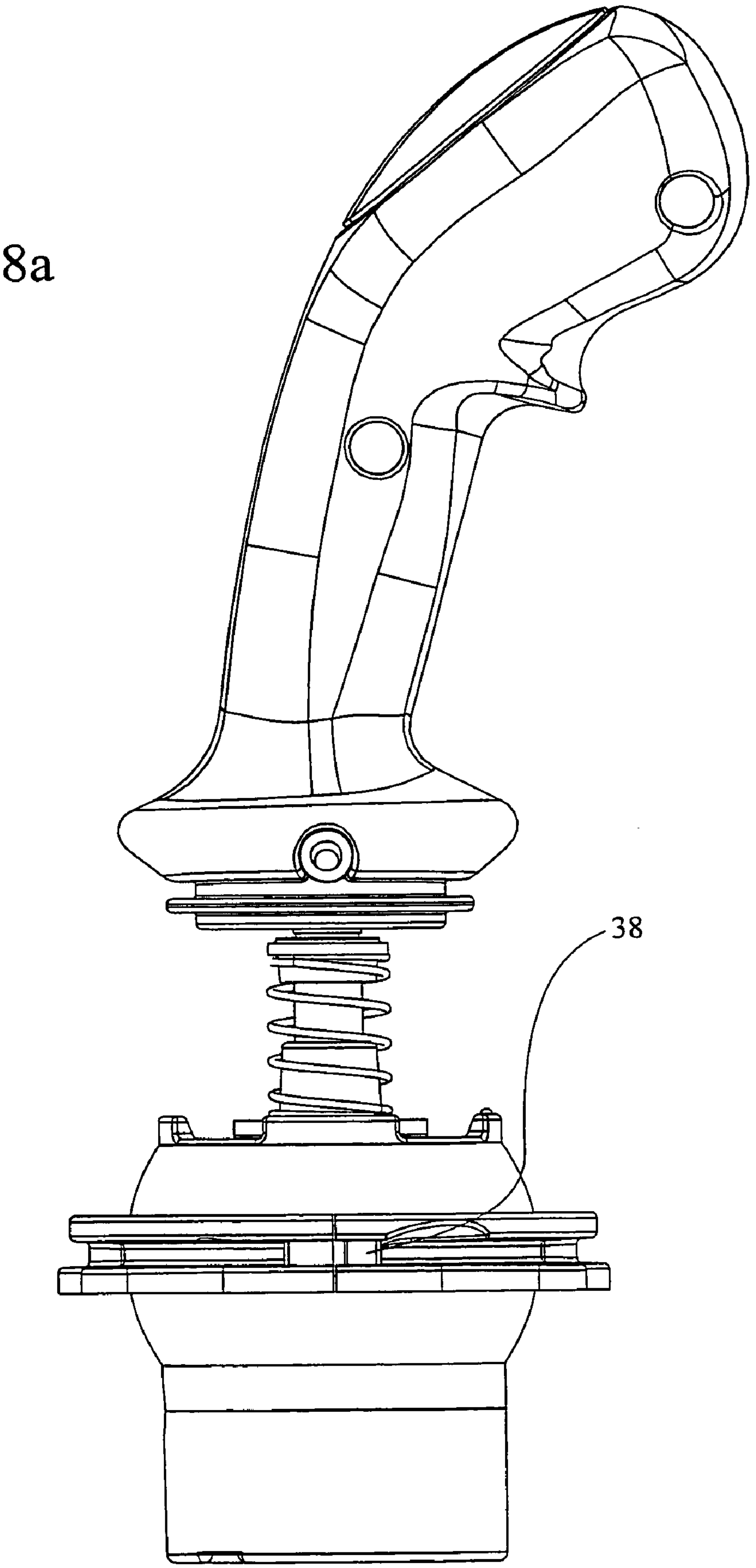
FIG. 8*a* is, in right side elevation view, the device of FIG. 6.
Figure 8B:
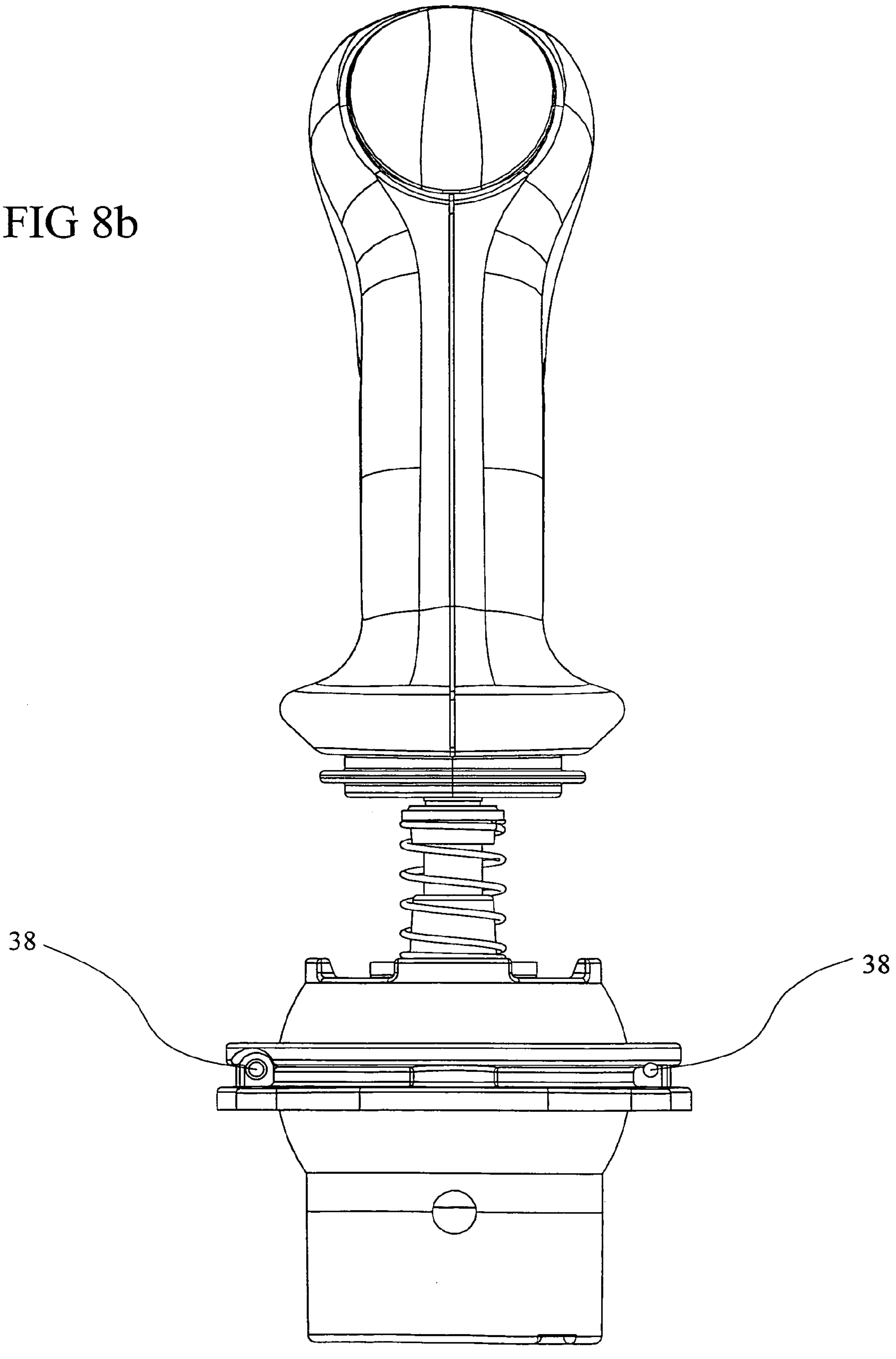
FIG. 8*b* is, in rear elevation view, the device of FIG. 6.
Figure 8C:
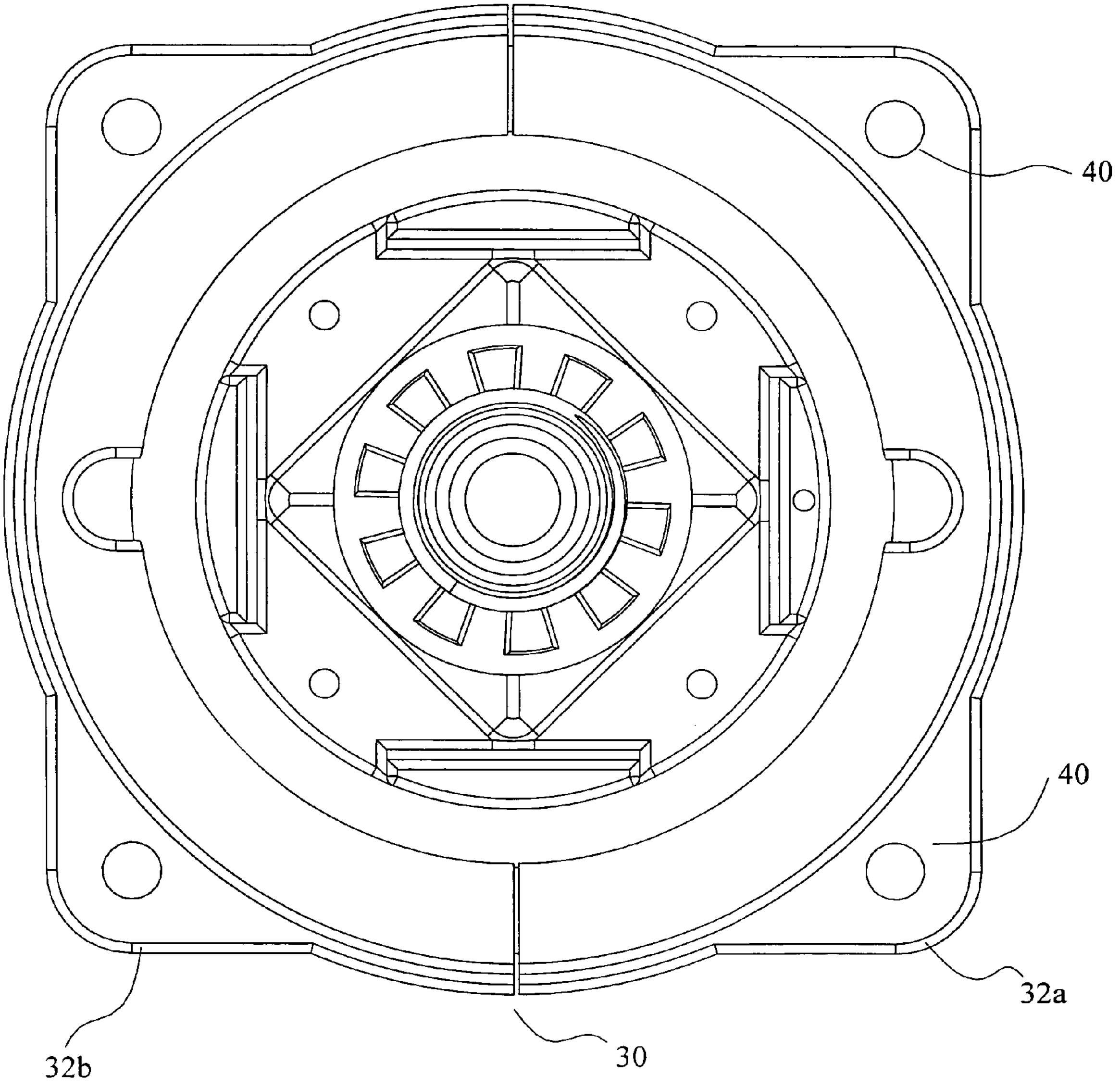
FIG. 8*c* is, in plan view, the device of FIG. 6.

In FIG. 2, housing 16 is fixed in a vertical orientation such that shaft 14 is parallel with axis A, where axis A is perpendicular to mounting brackets 22 and 24. By loosening screws 26, brackets 22 and 24 are separated and the angle and orientation of housing 16 may be adjusted. Housing 16 may then be realigned to a comfortable position for the operator, and anchored in a new position by the tightening of screws 26. For example, as illustrated in FIG. 3, housing 16 is aligned such that the rest position of shaft 14 lies 15 degrees from axis A. The spheroid-and-socket form of mounting provides greater flexibility in designing work environments, and allows operators to easily adjust the position and orientation of housing 16, and thus handle 10, to suit their particular preferences and to be most comfortable at rest.

In the alternative embodiment of FIGS. 6, 7, 8*a*-8*c* the interface between the pair of clamping brackets or members is a generally planar interface zone 30. Left and right mounting brackets 30*a* and 30*b* releasably clamp tightly together around the maximum circumference 34 or girth of at least a portion of the spheroid-shaped curvilinear housing 36 of the joystick. The brackets, when tightened securely to each other, hold the housing 36 in a band 30*a* containing the maximum circumference 34. The contact channels of the brackets are concave in at least the cross-section of FIG. 7. When the two clamping screws 38 are loosened, the housing may be repositioned for example approximately to a maximum of twenty-four degrees about any of the x, y, z principal axes. The screw holes 40 are used to fasten the brackets to a consol or seat arm-rest (not shown).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A joystick having a handle and a base shaft having opposite upper and lower ends, and a curvilinear housing, wherein said handle is mounted on said upper end of said base shaft and said lower end of said base shaft is mounted into said curvilinear housing, and wherein said curvilinear housing has an outer curvilinear surface formed so as to include at least a clamp support portion of a zone of a spheroid between two generally horizontal and parallel planes wherein said zone includes a portion of said spheroid having the maximum circumference of said spheroid so that said curvilinear housing may be braced by clamped support of said portion, a releasable clamp having at least two cooperating clamp members releasably mountable by releasable fasteners onto said clamp support portion along a clamp-member interface so as to support and clamp therebetween said portion of said spheroid having the maximum circumference of said spheroid.

2. The device of claim 1 wherein said clamp-member interface is substantially vertical.

3. The device of claim 1 wherein said clamp-member interface is substantially horizontal.

4. The device of claim 2 wherein said interface is planar.

5. The device of claim 3 wherein said interface is planar.

6. The device of claim 1 wherein said spheroid is a sphere.

7. The device of claim 3 wherein said clamp support portion of said zone is a continuous curvilinear band around said spheroid.

8. The device of claim 7 wherein said spheroid is a sphere.

9. The device of claim 7 wherein said curvilinear housing is a sphere.

10. The device of claim 7 wherein said clamp members are plates each having apertures sized to snugly mate onto said spheroid.

11. The device of claim 10 wherein said releasable fasteners are threaded fasteners releasably mating said plates together so as to sandwich therebetween said zone containing said maximum circumference.

12. The device of claim 2 wherein said clamp support portion of said zone is a continuous curvilinear band around said spheroid.

13. The device of claim 12 wherein said spheroid is a sphere.

14. The device of claim 12 wherein said curvilinear housing is a sphere.

15. The device of claim 12 wherein said clamp members are a pair of C-shaped channelled brackets mounted in opposed facing relation so as to form a snug ring around said band, said band containing said maximum circumference, to thereby support said spheroid clamped within said ring.

16. The device of claim 15 wherein said spheroid is a sphere.

17. The device of claim 15 wherein said releasable fasteners are threaded fasteners releasably mating said channelled brackets together so as to sandwich said band therebetween.

18. The device of claim 11 wherein said threaded fasteners are vertical.

19. The device of claim 17 wherein said threaded fasteners are horizontal.

20. The device of claim 15 wherein said channel brackets have contact channels contacting said spheroid around said snug ring, and wherein said contact channels are concave in cross-section.

* * * * *